UNITED STATES PATENT OFFICE.

MARK H. LACKERSTEEN, OF CHICAGO, ILLINOIS.

TABLE-SAUCE.

SPECIFICATION forming part of Letters Patent No. 281,276, dated July 17, 1883.

Application filed March 30, 1883. (Specimens.)

*To all whom it may concern:*

Be it known that I, MARK H. LACKERSTEEN, a citizen of Great Britain, residing in Chicago, in the county of Cook and State of Illinois, have invented a new and useful Improvement in Table-Sauce, of which the following is a specification.

Pepsin, or the albumenoid ferment which is the active principle of the gastric juice, has for some years past been artificially manufactured as a remedial agent for the treatment of dyspepsia. The preparation of pepsin has undergone several material and important modifications since it was first introduced; but its use has always been, and is still, limited as a medicine or drug prescribed by the physician and dispensed by the druggist for the relief of patients troubled with indigestion.

The object of my invention is to employ pepsin as a dietetic rather than a medicine, at the dinner-table rather than the bedside, and in the form of a desirable and toothsome relish or zest rather than the offensive and disagreeable drug sold in the shop.

In practicing my invention I dissolve pure pepsin—that is, pepsin as free from impurities as it can be prepared, and without the addition of the adulterants usually mixed therewith—such as sugar of milk, starch, &c.—in any acid flavoring-fluid—say pickle juice or sauce—preferably in the proportion of from fifty to one hundred grains of the pepsin to one pint of the fluid, juice, or sauce, (though the proportion of pepsin may be varied to suit the necessities of the case.) The mixture may be added to or mixed with meat or other albuminous food, and when so used it is agreeable to the taste, stimulates the appetite, aids the digestive action, and relieves and prevents the painful and inconvenient symptoms which usually attend the functional disorders of the stomach. The combination of the pepsin and sauce is thus at once an appetizing and digestive relish and an invaluable dietetic condiment.

Among the sauces to which the pepsin may be thus added are the ordinary table-sauces and catsups.

By my invention the taste of the pepsin, which it is so difficult to disguise, is, even when used in the larger proportion than that specified, entirely covered or dissipated, the digestive qualities of the pepsin are intensified and quickened, the ferment is brought into direct contact with the food which it is to digest, without nauseating the patient and without detracting from the appetizing effect of the sauce as such, and is held in solution without injury, instead of being precipitated and impaired as it is in alcoholic mixtures.

I claim—

The digestive sauce herein described, composed of an acid flavoring fluid, juice, or sauce, with pure, unadulterated pepsin dissolved therein.

MARK H. LACKERSTEEN.

Witnesses:
   H. M. MUNDAY,
   EDW. S. EVARTS.